United States Patent
Goto et al.

(10) Patent No.: US 12,366,671 B2
(45) Date of Patent: Jul. 22, 2025

(54) SCINTILLATOR STRUCTURE AND METHOD OF EVALUATING SCINTILLATOR

(71) Applicant: Proterial, Ltd., Tokyo (JP)

(72) Inventors: Shunsuke Goto, Tokyo (JP); Satoshi Shiota, Tokyo (JP); Shinsuke Terazawa, Tokyo (JP)

(73) Assignee: PROTERIAL, LTD., Tokyo (JP)

( * ) Notice: Subject to any disclaimer, the term of this patent is extended or adjusted under 35 U.S.C. 154(b) by 458 days.

(21) Appl. No.: 18/057,795

(22) Filed: Nov. 22, 2022

(65) Prior Publication Data

US 2024/0069221 A1  Feb. 29, 2024

(30) Foreign Application Priority Data

Aug. 24, 2022 (JP) .................. 2022-133120

(51) Int. Cl.
*G01T 1/203* (2006.01)
*G01N 23/2251* (2018.01)
*G01T 1/20* (2006.01)

(52) U.S. Cl.
CPC ......... *G01T 1/203* (2013.01); *G01N 23/2251* (2013.01); *G01T 1/2002* (2013.01); *G01T 1/2018* (2013.01)

(58) Field of Classification Search
CPC ..... G01T 1/203; G01T 1/2002; G01T 1/2018; G01T 1/20; G01N 23/2251; G01N 23/22; G01N 23/2202; C09K 11/7701; C09K 11/025; G01B 11/02
See application file for complete search history.

(56) References Cited

U.S. PATENT DOCUMENTS

| | | | |
|---|---|---|---|
| 6,177,030 B1* | 1/2001 | Shoji | G21K 4/00 427/64 |
| 9,567,517 B2* | 2/2017 | Fukuda | G01T 3/06 |
| 2017/0363753 A1* | 12/2017 | Arimoto | G01T 1/2002 |
| 2019/0025442 A1* | 1/2019 | Sawamoto | G01T 1/2012 |
| 2022/0002617 A1 | 1/2022 | Kuriwada et al. | |
| 2022/0099846 A1 | 3/2022 | Nobumoto et al. | |

FOREIGN PATENT DOCUMENTS

| | | |
|---|---|---|
| EP | 2826835 B1 | 3/2018 |
| JP | 2022-058073 A | 4/2022 |
| JP | 2022-079677 A | 5/2022 |

OTHER PUBLICATIONS

Extended European Search Report for European Patent Application No. 22211924.0 dated Aug. 30, 2023.

* cited by examiner

*Primary Examiner* — Kiho Kim
(74) *Attorney, Agent, or Firm* — McCormick, Paulding & Huber PLLC

(57) ABSTRACT

A scintillator structure includes a scintillator and a reflecting material that covers the scintillator. Here, the scintillator includes a resin and a phosphor, and a phosphor particle perimeter indicating a normalized length of an interface between the phosphor and the resin in a cross-sectional image of the scintillator is smaller than 6.25.

8 Claims, 6 Drawing Sheets

SCINTILLATOR STRUCTURE AND METHOD OF EVALUATING SCINTILLATOR

CROSS-REFERENCE TO RELATED APPLICATION

The present application claims priority from Japanese Patent Application No. 2022-133120 filed on Aug. 24, 2022, the content of which is hereby incorporated by reference into this application.

TECHNICAL FIELD OF THE INVENTION

The present invention relates to a scintillator structure and a method of evaluating a scintillator, and relates to, for example, a technique effectively applied to a scintillator structure having a scintillator including a resin and a phosphor and a method of evaluating the scintillator.

BACKGROUND OF THE INVENTION

Japanese Unexamined Patent Application Publication No. 2022-58073 (Patent Document 1) describes a technique for increasing a luminous output of a scintillator structure.

SUMMARY OF THE INVENTION

A scintillator is a substance that absorbs energy of radiation and generates visible light when irradiated with radiation represented by X-rays and gamma rays. This scintillator is commercialized as a scintillator structure including a scintillator and a reflecting material, and an X-ray detector obtained by combining the scintillator structure and a photoelectric conversion element such as a photodiode is used in, for example, medical equipment such as X-ray CT, analytical equipment, a non-destructive inspection device using radiation, a radiation leakage inspection device, and the like.

For example, a ceramic made of gadolinium oxysulfide ($Gd_2O_2S$) is used for the scintillator. In this specification, the gadolinium oxysulfide is referred to as "GOS". Strictly speaking, the gadolinium oxysulfide itself hardly emits light, and emits light by containing a luminescent element such as praseodymium or terbium in the gadolinium oxysulfide. Therefore, in this specification, the term "GOS" is used to imply a light-emitting substance (phosphor) in which praseodymium, terbium, or the like is contained in gadolinium oxysulfide itself. However, when it is necessary to explicitly indicate that praseodymium, terbium, or the like is contained in gadolinium oxysulfide itself, it may be expressed as "GOS" containing praseodymium or "GOS" containing terbium.

Also, when the scintillator is composed of "GOS" alone, the "GOS" is composed of ceramic. Meanwhile, as will be described later, it has also been studied to compose the scintillator from a mixture of the "GOS" and a resin, and the "GOS" in this case is composed of powder. Therefore, in this specification, when it is not particularly necessary to clearly indicate the ceramic and the powder, they are simply referred to as the "GOS". In contrast, when it is necessary to clearly indicate the ceramic, it is referred to as "GOS" ceramic. On the other hand, when it is necessary to clearly indicate the powder, it is referred to as "GOS" powder.

The "GOS" ceramic has an advantage of higher luminous output of visible light than cadmium tungstate ($CdWO_4$), but it is expensive to manufacture.

Therefore, in order to reduce the manufacturing cost of the scintillator structure, it has been studied to use a mixture of "GOS" powder and resin as the scintillator.

However, if the mixture of "GOS" powder and resin is used, the manufacturing cost can be reduced, but the luminous output of visible light is also reduced at the same time. Therefore, when the mixture of "GOS" powder and resin is used as the scintillator, it is desired to increase the luminous output of visible light.

A scintillator structure according to an embodiment includes a scintillator and a reflecting material that covers the scintillator. Here, the scintillator includes a resin and a phosphor, and a phosphor particle perimeter indicating a normalized length of an interface between the phosphor and the resin in a cross-sectional image of the scintillator is smaller than 6.25.

A method of evaluating a scintillator according to an embodiment is a method of evaluating a scintillator including a resin and a phosphor. The method of evaluating the scintillator includes a step of evaluating performance of the scintillator based on a correlation between a phosphor particle perimeter indicating a normalized length of an interface between the phosphor and the resin in a cross-sectional image of the scintillator and a luminous output of the scintillator.

According to the embodiment, the luminous output of the scintillator structure can be increased.

BRIEF DESCRIPTIONS OF THE DRAWINGS

DESCRIPTIONS OF THE PREFERRED EMBODIMENT

Figure 1:
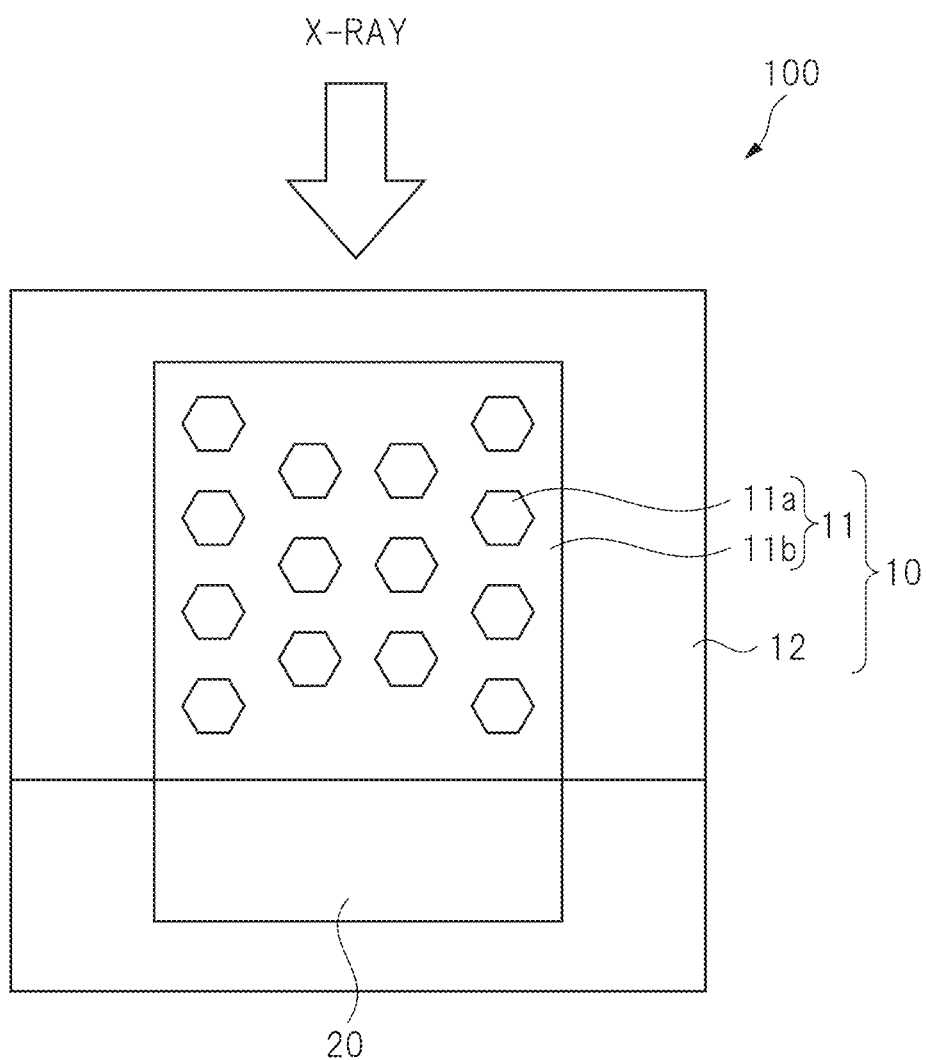
FIG. 1 is a diagram schematically showing an X-ray detector.

In all the drawings for describing the embodiment, the same members are denoted by the same reference characters in principle, and repetitive description thereof will be omitted. Note that hatching may be applied even in a plan view for easy understanding of the drawings.

Outline of X-Ray Detector

FIG. 1 is a diagram schematically showing an X-ray detector.

In FIG. 1, an X-ray detector 100 includes a scintillator structure 10 and a light receiving element 20. The scintillator structure 10 is composed of a scintillator 11 that generates visible light from X-rays incident on the X-ray detector 100 and a reflecting material 12 that covers the scintillator 11. On the other hand, the light receiving element 20 has a function of generating current from the visible light generated in the scintillator 11, and is composed of, for example, a photoelectric conversion element typified by a photodiode.

The scintillator 11 has a function of absorbing X-rays and generating visible light, and is composed of a phosphor 11a and a resin 11b. In this specification, a material obtained by mixing "GOS" powder constituting the phosphor 11a and the resin 11b may be referred to also as "resin GOS". Namely, the scintillator 11 in the present embodiment is composed of "resin GOS". The phosphor 11a is gadolinium oxysulfide containing a luminescent element such as praseodymium or terbium, and the resin 11b is, for example, an epoxy resin. Further, the reflecting material 12 is made of an epoxy resin containing titanium oxide.

The X-ray detector thus configured operates as follows.

That is, when the X-ray is incident on the scintillator 11 of the scintillator structure 10, electrons in the phosphor 11a constituting the scintillator 11 receive energy of the X-ray to transition from a ground state to an excited state. Thereafter, the electrons in the excited state transition to the ground state. At this time, the visible light corresponding to the energy difference between the excited state and the ground state is emitted. By such a mechanism, the scintillator 11 absorbs the X-ray to generate the visible light.

Then, a part of the visible light generated from the scintillator 11 is directly incident on the light receiving element 20, and another part of the visible light generated from the scintillator 11 is condensed on the light receiving element 20 while being repeatedly reflected by the reflecting material 12 covering the scintillator 11. Subsequently, when the visible light is incident on the light receiving element 20 composed of the photodiode, electrons of the semiconductor material constituting the photodiode are excited from a valence band to a conduction band by the energy of the visible light. Consequently, the current caused by the electrons excited in the conduction band flows through the photodiode. Then, an X-ray image is obtained based on the current output from the photodiode. In this way, the X-ray detector 100 can obtain the X-ray image.

Reason for Adoption of "Resin GOS"

As described above, in the present embodiment, the "resin GOS" is adopted as the scintillator 11. Hereinafter, the reason for this will be described.

For example, cadmium tungstate (hereinafter referred to as "CWO") is used as the scintillator 11 constituting the scintillator structure 10, but the "CWO" contains cadmium which is a substance subject to the RoHS Directive/REACH regulation. From this, instead of the "CWO" containing cadmium, the "GOS" ceramic has been used as the scintillator 11. The "GOS" ceramic has a merit of higher luminous output of visible light than the "CWO", but has a demerit of higher manufacturing cost.

Therefore, from the viewpoint of reducing the manufacturing cost, it has been studied to adopt as the scintillator 11 the "resin GOS" obtained by mixing a resin made of an epoxy resin or the like and "GOS" powder in place of the "GOS" ceramic. Namely, in order to suppress the increase in manufacturing cost due to the "GOS" ceramic, using the "resin GOS" which is less expensive than the "GOS" ceramic as the scintillator 11 is being promoted. However, the luminous output of the "resin GOS" is lower than that of the "GOS" ceramic, and it is desired to secure the luminous output even when the "resin GOS" is adopted as the scintillator 11.

Factors of Reduction in Luminous Output

First, a cause of reduction in the luminous output in the "resin GOS" will be described.

The "resin GOS" is composed of, for example, a mixture of the resin such as the epoxy resin and the "GOS" powder. Then, both the epoxy resin and the "GOS" powder have translucency for the visible light. In this regard, the translucency of the epoxy resin is higher than the translucency of the "GOS". From this, the translucency of the "resin GOS" is higher than the translucency of the "GOS" ceramic. Therefore, as a result of the translucency of the "resin GOS" being higher than the translucency of the "GOS", it seems that the luminous output of the scintillator 11 using the "resin GOS" is higher than the luminous output of the scintillator 11 using the "GOS" ceramic.

However, in practice, the luminous output of the scintillator 11 using the "resin GOS" is lower than the luminous output of the scintillator 11 using the "GOS" ceramic.

This is considered to be because the "GOS" powder is used in the "resin GOS" and thus a total surface area of the "GOS" powder constituting the "resin GOS" is larger than a total surface area of the "GOS" ceramic. Specifically, since a large amount of "GOS" powder is present in the epoxy resin in the "resin GOS", even if light generated in the "GOS" powder is emitted from the "GOS" powder into the epoxy resin, the light is then multiply scattered on the surface of the "GOS" powder present in large amount, and light absorption occurs on the surface of the "GOS" powder each time the light is scattered. As a result, since the greater light absorption occurs in the "resin GOS" than that in the "GOS" ceramic, it is conceivable that the luminous output of the scintillator 11 using the "resin GOS" is lower than the luminous output of the scintillator 11 using the "GOS" ceramic.

In this regard, the inventors of this application have focused on the above-described causes and made intensive studies from the viewpoint of increasing the luminous output of the scintillator 11 using the "resin GOS", and as a result, obtained the following new knowledge. Thus, the new knowledge found by the inventors of this application will be described below.

New Knowledge Found by Inventors

In the scintillator 11 using the "resin GOS", the total surface area of the "GOS" powder constituting the "resin GOS" is larger than the total surface area of the "GOS" ceramic. This means that multiple scattering is likely to occur at the interface between the "GOS" powder and the epoxy resin in the scintillator 11 using the "resin GOS", and as a result, the light absorption during multiple scattering increases and the luminous output decreases in the scintillator 11 using the "resin GOS".

In other words, there is a negative correlation between the total surface area of the "GOS" powder and the luminous output of the scintillator 11 using the "resin GOS". Specifically, when the total surface area of the "GOS" powder increases, the multiple scattering is likely to occur at the interface between the "GOS" powder and the epoxy resin, and as a result, the luminous output of the scintillator 11 using the "resin GOS" decreases. On the other hand, when the total surface area of the "GOS" powder decreases, the multiple scattering at the interface between the "GOS" powder and the epoxy resin is suppressed, and as a result, the luminous output of the scintillator 11 using the "resin GOS" increases.

As described above, it can be qualitatively understood that there is the negative correlation between the total surface area of the "GOS" powder and the luminous output of the scintillator 11 using the "resin GOS".

However, considering the quantitative evaluation of the negative correlation between the total surface area of the "GOS" powder and the luminous output of the scintillator 11 using the "resin GOS", it is difficult to calculate a physical quantity like the total surface area of the "GOS" powder from a structure of the scintillator structure that is a product. This is because the physical quantity like the total surface area of the "GOS" powder is a two-dimensional quantity, and it is difficult to calculate it by analyzing the three-dimensional structure of the scintillator structure that is an actual product.

Therefore, the inventors of this application focus on a physical quantity called a "phosphor particle perimeter" as a dimensionless quantity having a positive correlation with the total surface area of the "GOS" powder. The "phosphor particle perimeter" mentioned in this specification is defined as a normalized length of an interface between the phosphor and the resin in a cross-sectional image of the scintillator 11. Specifically, it is understood that the "phosphor particle perimeter" is the dimensionless quantity because it is given by the following (Formula 1) and represents the normalized length of the interface.

[Formula 1]

$$\text{Phosphor Particle Perimeter} = \frac{\text{Number of Pixels at Interface [pixel]}}{\text{Pixel Size [pixel]}} \times \frac{100[\mu m^2]}{\text{Total Area }[\mu m^2]} \quad \text{Formula (1)}$$

The "phosphor particle perimeter" defined in this manner is considered to have a positive correlation with the total surface area of the "GOS" powder constituting the "resin GOS". This is because the increase in the total surface area of the "GOS" powder means the increase in the interface between the "GOS" powder and the epoxy resin. Namely, the "phosphor particle perimeter" is considered to be the dimensionless quantity having a positive correlation with the two-dimensional quantity like the total surface area.

Here, considering that there is the negative correlation between the total surface area of the "GOS" powder and the luminous output of the scintillator 11 using the "resin GOS" and there is the positive correlation between the total surface area of the "GOS" powder and the "phosphor particle perimeter", it can be derived that there is a negative correlation between the "phosphor particle perimeter" and the luminous output of the scintillator 11 using the "resin GOS". Namely, the inventors of this application have focused on the physical quantity called the "phosphor particle perimeter" as an index indicating a size of the interface between the "GOS" powder and the epoxy resin, and newly found that there is the negative correlation between the "phosphor particle perimeter" and the luminous output of the scintillator 11 using the "resin GOS".

As described above, the knowledge newly found by the inventors of this application is that there is the negative correlation between the "phosphor particle perimeter" and the luminous output of the scintillator 11 using the "resin GOS". Namely, the knowledge found by the inventors of this application is that the luminous output of the scintillator 11 using the "resin GOS" increases as the "phosphor particle perimeter" decreases, while the luminous output of the scintillator 11 using the "resin GOS" decreases as the "phosphor particle perimeter" increases. Further, the physical quantity like the "phosphor particle perimeter" is the dimensionless quantity like the normalized length of the interface, and can be calculated from the cross-sectional image (two-dimensional image) of the scintillator 11.

Namely, the physical quantity like the total surface area of the "GOS" powder is the two-dimensional quantity, it is difficult to calculate it by analyzing the three-dimensional structure of the scintillator structure that is an actual product, and it cannot be calculated from the cross-sectional image of the scintillator 11. In contrast, the "phosphor particle perimeter" is the dimensionless quantity like the normalized length of the interface, and can be easily calculated from the cross-sectional image of the scintillator 11. From this, the knowledge based on the "phosphor particle perimeter" is useful in that it is easy to quantitatively evaluate the negative correlation between the "phosphor particle perimeter" and the luminous output of the scintillator 11 using the "resin GOS".

Method of Manufacturing Scintillator Structure

Next, a method of manufacturing the scintillator structure 10 will be described. First, the method of manufacturing the scintillator structure 10 will be described, and then a method of manufacturing the scintillator structure 10 having a different "phosphor particle perimeter" will be described.

Figure 2:
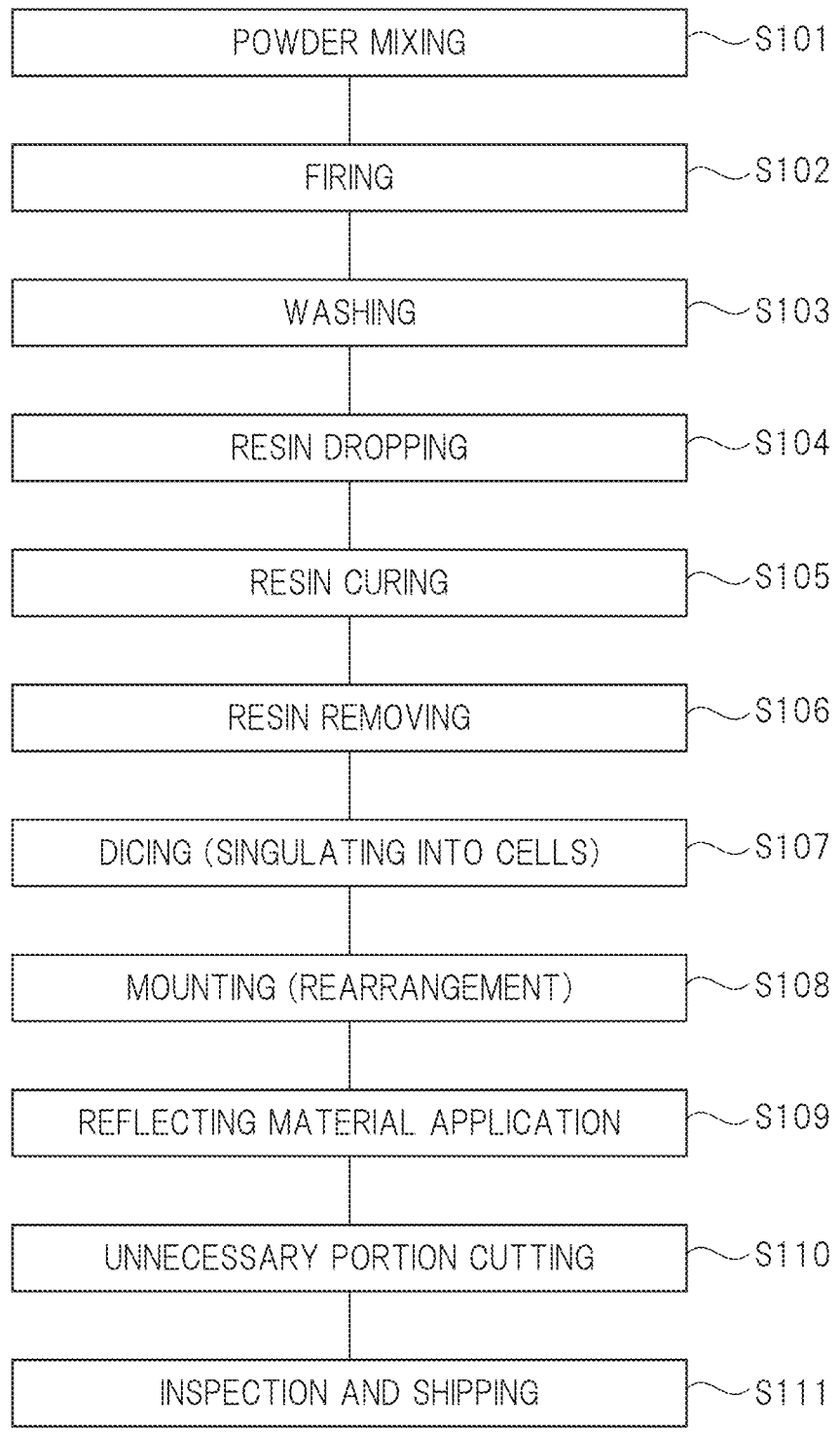
FIG. 2 is a flowchart showing a flow of a manufacturing process of a scintillator structure.

FIG. 2 is a flowchart showing a flow of a manufacturing process of the scintillator structure.

In FIG. 2, first, predetermined amounts of raw material powder and flux component are weighed and mixed (S101), and then this mixture is filled in a crucible and fired in an atmosphere furnace at 1300° C. to 1400° C. for 7 to 9 hours (S102) to produce the "GOS" powder. Then, the flux component and impurities contained in the "GOS" powder are removed by washing using hydrochloric acid and warm water (S103).

Next, the epoxy resin is impregnated into the "GOS" powder by dropping the epoxy resin onto the "GOS" powder (S104). Subsequently, the epoxy resin is cured (S105), and then the epoxy resin not mixed with the "GOS" powder is removed (S106). Consequently, the scintillator made of the "resin GOS" can be formed. Subsequently, a substrate on which the scintillator is formed is diced to singulate the substrate into a plurality of cells (S107). After the plurality of singulated cells are rearranged (S108), the reflecting material is applied to cover the plurality of cells (S109). Then, after an unnecessary portion as the scintillator structure 10 is cut (S110), the scintillator structure 10 that has passed an inspection is shipped (S111).

Method of Realizing Different "Phosphor Particle Perimeter"

Here, in the method of manufacturing the scintillator structure 10, the scintillator structure 10 having a different "phosphor particle perimeter" can be manufactured by changing a particle size of the "GOS" powder or a weight ratio of the epoxy resin to the "GOS" powder (phosphor).

Significance of Adopting "Phosphor Particle Perimeter"

As described above, for example, the "phosphor particle perimeter" can be changed by changing the particle size of the "GOS" powder or the weight ratio of the epoxy resin to the "GOS" powder (phosphor). Considering that there is the negative correlation between the "phosphor particle perimeter" and the luminous output of the scintillator 11 using the "resin GOS", this suggests that the particle size of the "GOS" powder and the weight ratio of the epoxy resin to the "GOS" powder (phosphor) also have some correlation with the luminous output of the scintillator 11 using the "resin GOS".

Therefore, it is also conceivable to define a correlation between the particle size of the "GOS" powder and the "luminous output" or a correlation between the weight ratio of the epoxy resin to the "GOS" powder (phosphor) and the "luminous output" instead of defining the correlation between the "phosphor particle perimeter" and the "luminous output".

However, it is desirable to define the correlation between the "phosphor particle perimeter" and the "luminous output". The reason for this will be described below.

For example, the particle size of the "GOS" powder is defined as a particle size during a manufacturing process of the "GOS" powder instead of a particle size in the structure of the scintillator structure 10 that is a product. Namely, when the correlation between the particle size of the "GOS" powder and the "luminous output" is defined, the particle size of the "GOS" powder is not a parameter that directly defines the structure of the scintillator structure 10 that is a product. In other words, even if the particle size of the "GOS" powder is defined, it cannot be said that the particle size accurately represents an actual particle size of the "GOS" powder in the structure of the scintillator structure 10 that is a product. This means that it cannot be said that the correlation between the particle size of the "GOS" powder and the "luminous output" in an actual structure of the scintillator structure 10 is correctly reflected.

Similarly, the weight ratio of the epoxy resin to the "GOS" powder (phosphor) is also defined as the weight ratio during a manufacturing process of the scintillator instead of a weight ratio in a structure of a scintillator structure 10A that is a product. Namely, when the correlation between the weight ratio of the epoxy resin to the "GOS" powder (phosphor) and the "luminous output" is defined, the weight ratio is not a parameter that directly defines the structure of the scintillator structure 10A that is a product. In other words, even if the weight ratio of the epoxy resin to the "GOS" powder (phosphor) is defined, it cannot be said that the weight ratio accurately represents an actual weight ratio in the structure of the scintillator structure 10 that is a product. This means that it cannot be said that the correlation between the weight ratio of the epoxy resin to the "GOS" powder (phosphor) and the "luminous output" in the actual structure of the scintillator structure 10 is correctly reflected.

In contrast, it can be said that the "phosphor particle perimeter" is a parameter directly reflecting the structure of the scintillator structure 10 that is a product because the "phosphor particle perimeter" is calculated from a cross-sectional image obtained from the scintillator structure 10A that is an actual product. In this respect, the "phosphor particle perimeter" is a parameter different from the particle size of the "GOS" powder and the weight ratio of the epoxy resin to the "GOS" powder (phosphor). Namely, when the correlation between the "phosphor particle perimeter" and the "luminous output" is defined, the "phosphor particle perimeter" is the parameter that directly defines the structure of the scintillator structure 10 that is a product. In other words, it can be said that the "phosphor particle perimeter" thus defined accurately represents an actual interface state in the structure of the scintillator structure 10 that is a product. This means that the correlation between the "phosphor particle perimeter" and the "luminous output" correctly reflects the structure of the scintillator structure 10 that is an actual product.

For this reason, it is desirable to define the correlation between the "phosphor particle perimeter" and the "luminous output". Therefore, in the present embodiment, rather than defining the correlation with the "luminous output" by using the particle size of the "GOS" powder and the weight ratio of the epoxy resin to the "GOS" powder (phosphor), it is defined that there is a negative correlation between the "phosphor particle perimeter" and the luminous output of the scintillator 11 using the "resin GOS".

Further, an advantage of adopting the correlation between the "phosphor particle perimeter" and the "luminous output" will be described.

For example, a case of establishing an infringement of an "accused device" will be considered. In this case, if the particle size of the "GOS" powder and the weight ratio of the epoxy resin to the "GOS" powder (phosphor) are defined, since the particle size of the "GOS" powder and the weight ratio are values during the manufacturing process, it is difficult to establish the infringement only by analyzing the "accused device" that is a product and it is necessary to establish the infringement back to the manufacturing process of the "accused device", that makes it difficult to establish the infringement.

In contrast, if the "phosphor particle perimeter" is defined, the "phosphor particle perimeter" can be calculated from a cross-sectional image of the "accused device" that is an actual product. Namely, if the "phosphor particle perimeter" is defined, it is not necessary to establish the infringement back to the manufacturing process of the "accused device", and the infringement can be established only by analyzing the "accused device" that is a product. From this, it becomes easy to establish the infringement of the "accused device" when the correlation between the "phosphor particle perimeter" and the "luminous output" is adopted.

From the above, it can be said that defining the correlation between the "phosphor particle perimeter" and the "luminous output" has great significance from the viewpoint of constructing a correlation accurately reflecting the actual structure of the scintillator structure 10 and the viewpoint of considering easiness of establishing the infringement.

Examples

Next, examples of quantitatively evaluating the negative correlation between the "phosphor particle perimeter" and the luminous output of the scintillator 11 using the "resin GOS" will be described.

Method of Fabricating "GOS" Powder

For example, the "GOS" powder is fabricated as follows.

First, predetermined amounts of raw material powder and flux component are weighed and mixed, and then this mixture is filled in a crucible and fired in an atmosphere furnace at 1300° C. to 1400° C. to produce the "GOS" powder. For example, firing is performed for 7 hours to 9 hours in Comparative Example 1, Comparative Example 2, and Example 1 described later, and firing is performed for 24 hours in Example 2, Example 3, and Example 4 described later. Further, in Examples 3 and 4, 10% of the raw material powder is replaced with the "GOS" powder. Then, the flux component and impurities contained in the "GOS" powder are removed by washing using hydrochloric acid and warm water. In this way, the "GOS" powder can be fabricated. Comparative Example 2 is a sample obtained by classifying the "GOS" powder obtained in Comparative Example 1 with a sieve having a mesh size of 53 Further, Example 1 is a sample obtained by classifying the "GOS" powder obtained in Comparative Example 1 with a sieve having a mesh size of 90 μm and by collecting the remaining on the mesh.

Method of Fabricating Scintillator

Subsequently, the scintillator is fabricated as follows.

Specifically, the epoxy resin is impregnated into the "GOS" powder by dropping the epoxy resin onto the "GOS" powder. Subsequently, the epoxy resin is cured, and then the epoxy resin not mixed with the "GOS" powder is removed. Consequently, the scintillator made of the "resin GOS" can be fabricated. For example, by using this fabricating method, the scintillator having a thickness of 2.6 mm is fabricated. Note that in order to prepare samples having different "phosphor particle perimeters", scintillators in which firing time, "GOS" powder/raw material powder weight ratio, classification, median diameter of the "GOS" powder, and the weight ratio of the resin to the "GOS" powder (phosphor) at the time of fabrication are different as shown in the following Table 1 are fabricated. Specifically, six samples of Comparative Examples 1 and 2 and Examples 1 to 4 are prepared.

TABLE 1

|  | Firing time (h) | "GOS" powder/ raw material powder weight ratio | Classification | Median diameter [μm] | Resin/"GOS" powder weight ratio |
|---|---|---|---|---|---|
| Comparative Example 1 | 7~9 | 0 | None | 54.9 | 0.31 |
| Comparative Example 2 | 7~9 | 0 | Classification under 53 μm | 33.0 | 0.31 |
| Example 1 | 7~9 | 0 | Classification over 90 μm | 78.6 | 0.31 |
| Example 2 | 24 | 0 | None | 75.2 | 0.31 |
| Example 3 | 24 | 0.1 | None | 100.0 | 0.31 |
| Example 4 | 24 | 0.1 | None | 100.0 | 0.62 |

Method of Calculating "Phosphor Particle Perimeter"

Next, a method of calculating the "phosphor particle perimeter" will be described.

Figure 3:
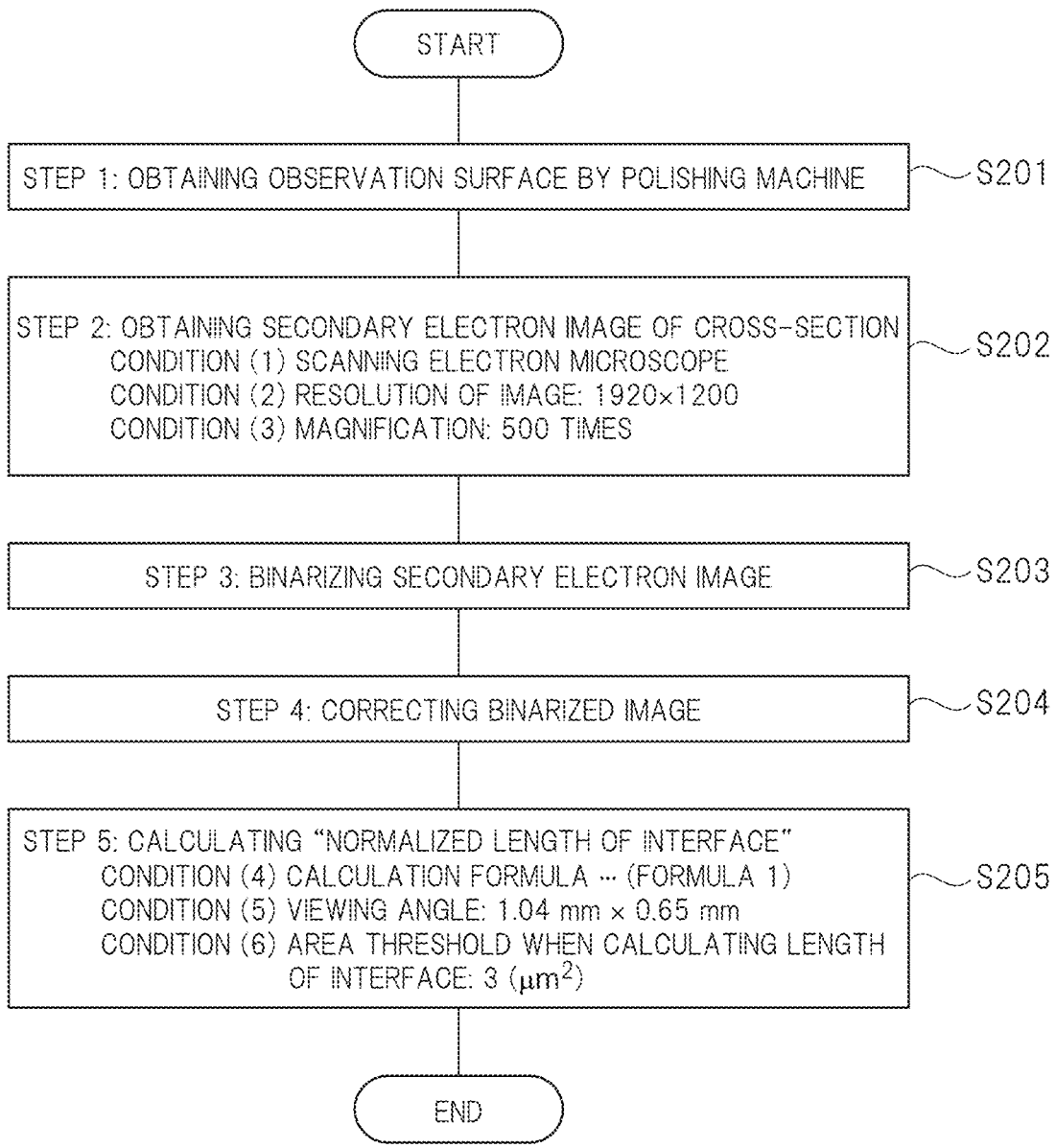
FIG. 3 is a flowchart showing a procedure for calculating a "phosphor particle perimeter"

FIG. 3 is a flowchart showing a procedure for calculating the "phosphor particle perimeter".

In FIG. 3, first, an observation surface is obtained using a polishing machine (step 1: S201). Here, polishing conditions are as shown in Table 2. In particular, in order to reduce influence of particle shedding of the "GOS" powder, polishing is performed by 100 μm close to a maximum particle diameter of the "GOS" powder.

TABLE 2

| Surface plate | Abrasive grain | Abrasive grain median diameter(μm) | Load (gr/cm$^2$) | Rotational speed (rpm) | Polishing rate (μm/hr) |
|---|---|---|---|---|---|
| Sn | Diamond | 0.5 | 83 | 30 | 1.9 |

Then, a secondary electron image of the obtained observation surface is obtained (step 2: S202). The observation surface is deposited with platinum for 30 seconds in order to prevent charge-up of a sample. At this time, the secondary electron image is obtained using a scanning electron microscope (condition (1)) under conditions of resolution of an image: 1920×1200 (condition (2)) and magnification: 500 times (condition (3)). Note that each sample is observed in three fields of view.

Subsequently, the obtained secondary electron image is binarized (step 3: S203). Then, after the binarized image is corrected (step 4: S204), the "phosphor particle perimeter" is calculated based on the corrected image (step 5: S205). Note that the binarization is performed using software "MatLab (manufactured by MathWorks, Inc.)". Parameters used for binarization and image correction are as shown in Table 3 below.

TABLE 3

| im_x0 | x-coordinate of starting point of image | 1 |
|---|---|---|
| im_y0 | y-coordinate of starting point of image | 1 |
| im_width | x-coordinate of end point of image | 1920 |
| im_hight | y-coordinate of end point of image | 1200 |
| grain_min | Minimum value when normalizing intensity of "GOS" powder | 50 |
| grain_max | Maximum value when normalizing intensity of "GOS" powder | 240 |
| norm_peak1 | Intensity of resin portion after normalization | 60 |
| norm_peak2 | Intensity of "GOS" powder portion after normalization | 200 |
| peak_th | Threshold of intensity of binarized peak detection | 128 |
| sigma | Size of Gaussian filter | 1 |
| bin_method | Binarization method | global |
| area_min | Area threshold at the time of binarization | 25 |
| wat_length | Interface length threshold when calculating phosphor particle perimeter | 32 |

Here, the "phosphor particle perimeter" is calculated using a calculation formula represented by (Formula 1) described above (condition (4)) under conditions of viewing angle: 1.04 mm×0.65 mm (condition (5)) and an area threshold when calculating the phosphor particle perimeter (a threshold for distinguishing an area region to be considered in the calculation from an area region not to be considered in the calculation): 3 (W) (condition (6)), and an average of the phosphor particle perimeter of each sample in three fields of view is calculated.

Note that according to the study of the inventors of this application, it has been found that a value of the "phosphor particle perimeter" greatly changes depending on calculation conditions. Therefore, in the above-described method of calculating the "phosphor particle perimeter", the calculation conditions are defined in detail as indicated in the above-described conditions.

Hereinafter, a specific image in the method of calculating the "phosphor particle perimeter" will be described.

Figure 4:
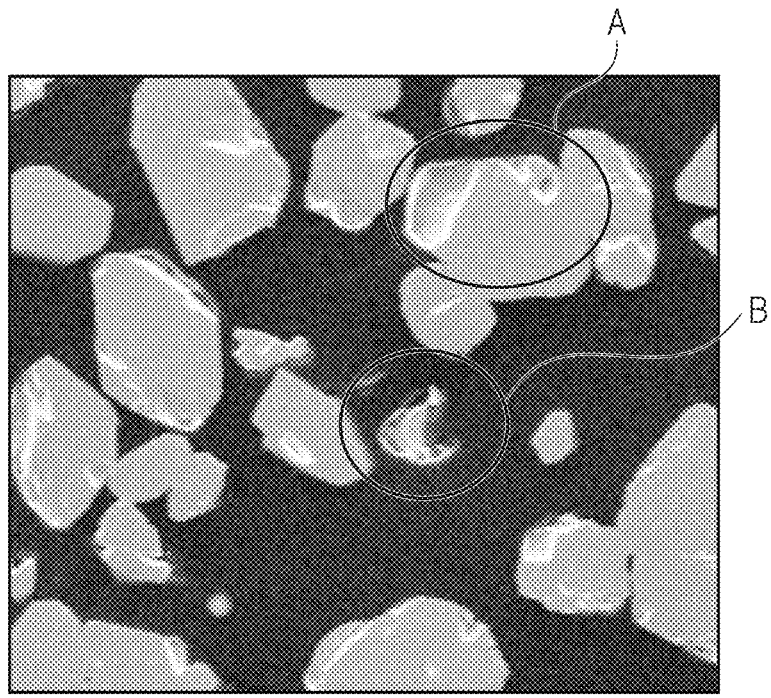
FIG. 4 is a diagram showing a secondary electron image.

FIG. 4 is a diagram showing the secondary electron image obtained from the observation surface of the sample by the scanning electron microscope. A processing mark is shown in a region A of FIG. 4, and a particle shedding portion is shown in a region B of FIG. 4. It is conceivable that the processing mark and the particle shedding portion are formed in, for example, a processing step when obtaining the observation surface of the sample.

Figure 5:
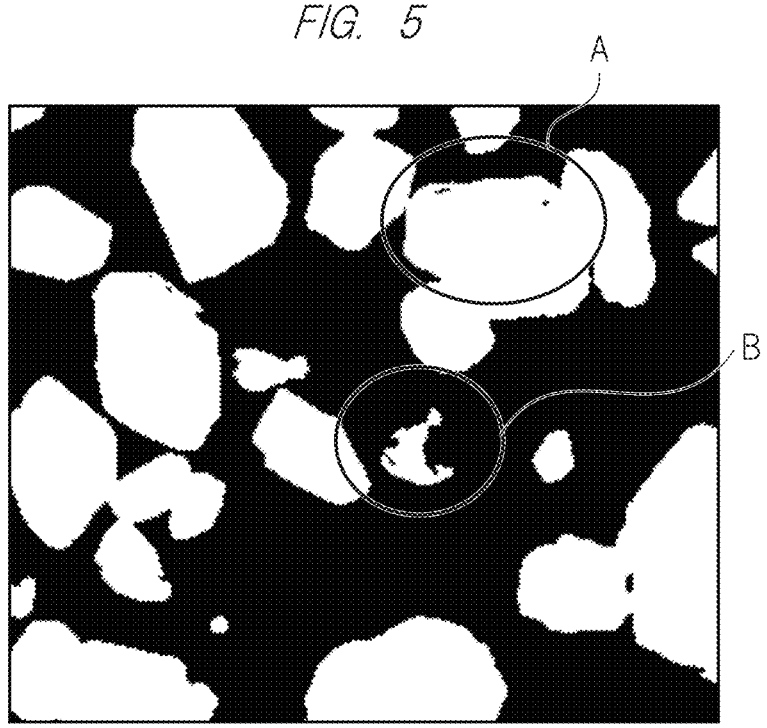
FIG. 5 is a diagram showing an image obtained by binarizing the secondary electron image.

Next, FIG. 5 is a diagram showing an image obtained by binarizing the secondary electron image shown in FIG. 4. It can be seen that a black spot corresponding to the processing mark existing in the region A of FIG. 4 exists in the region A of FIG. 5. In addition, it can be seen that a black region corresponding to the particle shedding portion existing in the region B of FIG. 4 exists in the region B of FIG. 5. As described above, it can be seen that when the processing mark and the particle shedding portion are directly binarized, they are expressed as black regions indicating the resin.

Therefore, for example, by comparing the secondary electron image shown in FIG. 4 with the binarized image shown in FIG. 5, the region where the "GOS" powder is present is corrected from black to white in the processing mark portion shown in the region A and the particle shedding portion shown in the region B.

Figure 6:
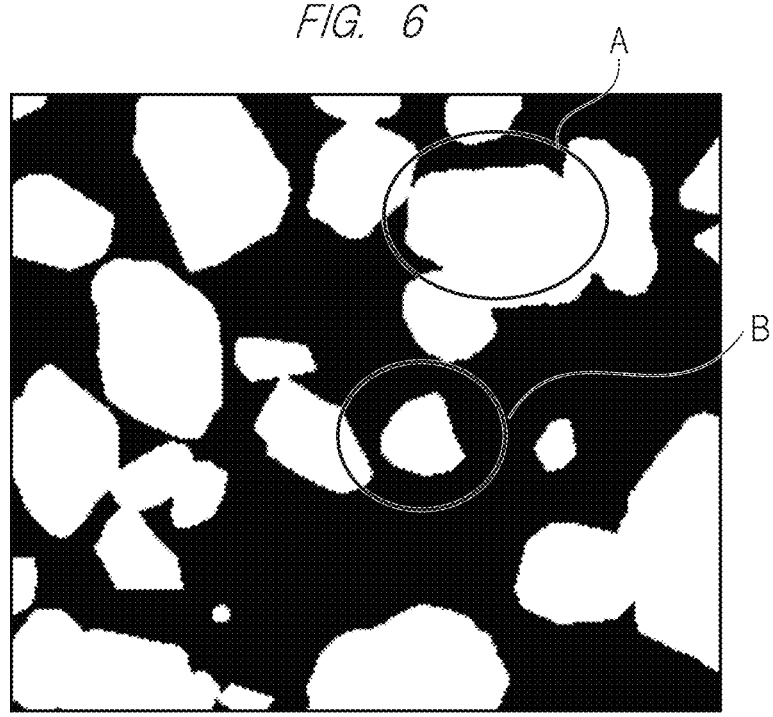
FIG. 6 is a diagram showing a corrected image.

Specifically, FIG. 6 is a diagram showing an image in which the region where the "GOS" powder is present in the processing mark portion shown in the region A and the particle shedding portion shown in the region B is corrected from black to white. As shown in FIG. 6, it can be seen that the region where the "GOS" powder is present is corrected from black to white in the processing mark portion shown in the region A and the particle shedding portion shown in the region B.

Figure 7:
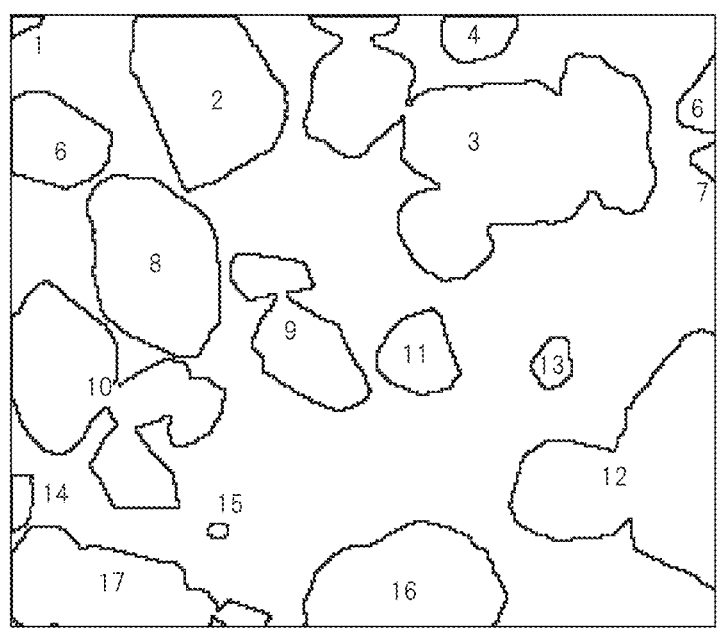
FIG. 7 is a diagram showing an image obtained by extracting an interface from the corrected image.

Subsequently, FIG. 7 is a diagram showing an image obtained by extracting an interface between the "GOS" powder and the resin from the corrected image shown in FIG. 6. By applying a relational expression expressed by (Formula 1) described above to the image shown in FIG. 7, the "phosphor particle perimeter" can be calculated.

Sample Evaluation Results

Next, for each of the plurality of samples, evaluation results of the luminous output and the "phosphor particle perimeter" calculated by the above-described method of calculating the "phosphor particle perimeter" will be described.

Table 4 shows the "luminous output" and the "phosphor particle perimeter" in each of the six samples such as Comparative Examples 1 and 2 and Examples 1 to 4.

TABLE 4

|  | Luminous output | Phosphor particle perimeter |
|---|---|---|
| Comparative Example 1 | 2320 | 6.25 |
| Comparative Example 2 | 1936 | 9.61 |
| Example 1 | 2395 | 4.09 |
| Example 2 | 2461 | 4.03 |
| Example 3 | 2605 | 2.48 |
| Example 4 | 2739 | 3.99 |

Figure 8:
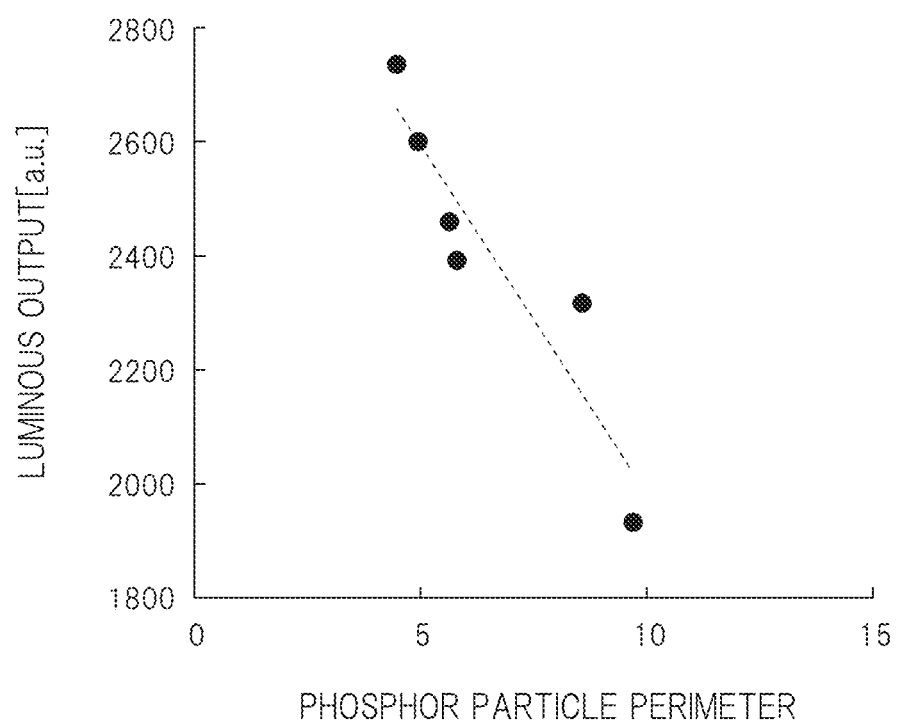
FIG. 8 is a graph showing a correlation between the "phosphor particle perimeter" and a "luminous output".

Further, FIG. 8 is a graph showing the correlation between the "phosphor particle perimeter" and the "luminous output" found based on Table 4. As shown in FIG. 8, it can be seen that there is a negative correlation between the "phosphor particle perimeter" and the "luminous output". Namely, it can be seen from FIG. 8 that the luminous output of the scintillator using the "resin GOS" increases as the "phosphor particle perimeter" decreases, while the luminous output of the scintillator using the "resin GOS" decreases as the "phosphor particle perimeter" increases. This is the knowledge newly found by the inventors of this application, and the evaluation results for the plurality of samples (Table 4 and FIG. 8) support that this insight is correct.

In particular, it can be seen from Table 4 that the "phosphor particle perimeter" in Examples 1 to 4 is 2.48 or more and smaller than 6.25, and smaller than the "phosphor particle perimeter" in Comparative Examples 1 and 2. Then, it can be seen that the "luminous output" in Examples 1 to 4 is larger than the "luminous output" in Comparative Examples 1 and 2.

Therefore, it can be seen from the results shown in Table 4 that the "luminous output" can be increased as compared with Comparative Examples 1 and 2 if the "phosphor particle perimeter" can be made smaller than 6.25.

Here, in Examples 1 to 4, a density of the cell (scintillator) is, for example, 4.3 g/cm$^3$ or more and 5.0 g/cm$^3$ or less.

Here, some additional remarks will be given to the "phosphor particle perimeter" in Comparative Example 1.

The sample in Comparative Example 1 is a sample described in the specification of the prior application (Japanese Patent Application No. 2021-123682) of the present applicant, and a value of a "normalized boundary length" is "6.21" based on the description (paragraph [0025], FIG. 4 and FIG. 5) of the prior application. However, the inventors of this application have found that the "phosphor particle perimeter" mentioned in this specification greatly changes depending on the calculation conditions, and the "phosphor particle perimeter" is "6.25" when the "phosphor particle perimeter" of the sample in Comparative Example 1 is calculated by the method of calculating the "phosphor particle perimeter" described in this specification.

Effects of Embodiment

As described above, the new knowledge found by the inventors of this application is that there is a negative correlation between the "phosphor particle perimeter" and the luminous output of the scintillator using the "resin GOS". Then, the new knowledge is supported to be correct by verification results according to the above-described Examples.

In particular, from the verification results based on Examples, the luminous output can be increased as compared with Comparative Example 1 when the "phosphor particle perimeter" is smaller than "6.25". From the viewpoint of increasing the luminous output, the "phosphor particle perimeter" is preferably "5.26" or less, and is more preferably "4.09" or less. As described above, according to the present embodiment, it is possible to increase the luminous output of the scintillator structure by reducing the "phosphor particle perimeter" of the scintillator structure.

Technique for Evaluating Scintillator

Further, performance of the scintillator can be evaluated based on the correlation between the "phosphor particle perimeter" and the luminous output of the scintillator using the "resin GOS". Specifically, the performance of the scintillator can be evaluated by utilizing the knowledge that there is a negative correlation between the "phosphor particle perimeter" and the luminous output of the scintillator using the "resin GOS". For example, the negative correlation between the "phosphor particle perimeter" and the "luminous output" shown in FIG. 8 is obtained based on the plurality of samples with different manufacturing conditions. Thereafter, the "phosphor particle perimeter" of the scintillator to be evaluated is calculated. Then, the "luminous output" corresponding to the calculated "phosphor particle perimeter" is estimated based on the acquired correlation. In this way, the performance (for example, "luminous output") of the scintillator to be evaluated can be evaluated.

As described above, it can be said that the technical idea in the present embodiment is excellent in that not only it provides a guideline for manufacturing a scintillator structure having a scintillator with a large "luminous output" by focusing on the "phosphor particle perimeter" but also it can be applied to a performance evaluation technique of the scintillator.

In the foregoing, the invention made by the inventors of this application has been specifically described based on the embodiment, but it goes without saying that the present invention is not limited to the embodiment described above and can be modified in various ways within the range not departing from the gist thereof.

What is claimed is:

1. A scintillator structure comprising:
a scintillator; and
a reflecting material that covers the scintillator,
wherein the scintillator includes a resin and a phosphor, and
wherein a phosphor particle perimeter indicating a normalized length of an interface between the phosphor and the resin in a cross-sectional image of the scintillator is smaller than 6.25.

2. The scintillator structure according to claim 1,
wherein the phosphor particle perimeter is measured through following steps 1 to 5:

(step 1) obtaining an observation surface of a cell by a polishing machine;
(step 2) obtaining a secondary electron image of the observation surface,
(condition 1) scanning electron microscope,
(condition 2) resolution of image: 1920×1200, and
(condition 3) magnification: 500 times;
(step 3) binarizing the secondary electron image;
(step 4) correcting the binarized image; and
(step 5) calculating the phosphor particle perimeter,
(condition 4) calculation formula phosphor particle perimeter=number of pixels of interface/pixel size×100 ($\mu m^2$)/total area ($\mu m^2$), (condition 5) viewing angle: 1.04 mm×0.65 mm, and
(condition 6) area threshold when calculating the length of the interface: 3 ($\mu m^2$).

3. The scintillator structure according to claim 1,
wherein the phosphor particle perimeter is 2.48 or more and less than 6.25.

4. The scintillator structure according to claim 1,
wherein a density of the scintillator is 4.3 g/cm$^3$ or more and 5.0 g/cm$^3$ or less.

5. The scintillator structure according to claim 1,
wherein the phosphor includes gadolinium oxysulfide containing a luminescent element.

6. The scintillator structure according to claim 5,
wherein the resin is an epoxy resin.

7. A method of evaluating a scintillator including a resin and a phosphor, the method comprising a step of evaluating performance of the scintillator based on a correlation between a phosphor particle perimeter indicating a normalized length of an interface between the phosphor and the resin in a cross-sectional image of the scintillator and a luminous output of the scintillator.

8. The method of evaluating the scintillator according to claim 7,
wherein the correlation is a negative correlation.

* * * * *